(12) United States Patent
Jones

(10) Patent No.: US 8,251,008 B1
(45) Date of Patent: Aug. 28, 2012

(54) BIRD REPELLER

(76) Inventor: Preston A. Jones, Elk Grove, CA (US)

(*) Notice: Subject to any disclaimer, the term of this patent is extended or adjusted under 35 U.S.C. 154(b) by 0 days.

(21) Appl. No.: 12/930,407

(22) Filed: Jan. 7, 2011

(51) Int. Cl.
*A01K 29/00* (2006.01)

(52) U.S. Cl. ..................... 116/22 A; 119/712

(58) Field of Classification Search ........... 119/702, 119/707, 708, 711–713; 52/101; 116/22 A; 256/10; 43/1, 16, 17, 2, 58, 26.1, 61, 98; 340/573.3, 573.1–572.9, 10.1–10.6; *A01K 15/00, A01K 15/02, 15/04, 29/00*
See application file for complete search history.

(56) References Cited

U.S. PATENT DOCUMENTS

| | | | |
|---|---|---|---|
| 3,633,560 A | 1/1972 | DeFreitas | |
| 4,597,357 A | 7/1986 | LeMessurier | |
| 4,598,660 A * | 7/1986 | Konzak | 116/22 A |
| 4,962,619 A | 10/1990 | Chatten | |
| 4,995,374 A * | 2/1991 | Black | 124/54 |
| 5,024,183 A * | 6/1991 | Baer | 119/712 |
| 5,181,338 A | 1/1993 | Chatten | |
| 5,477,635 A * | 12/1995 | Orsano | 43/81 |
| 5,894,672 A * | 4/1999 | Ellenburg et al. | 33/265 |
| 6,385,915 B1 | 5/2002 | Keeler | |
| 6,742,470 B2 | 6/2004 | Keithly | |
| 6,778,915 B2 * | 8/2004 | Kelly et al. | 702/41 |
| 7,114,465 B1 * | 10/2006 | Winter | 119/707 |
| 7,699,018 B2 * | 4/2010 | Wells | 116/22 A |
| 7,703,447 B2 * | 4/2010 | Caveza | 124/16 |
| 7,823,571 B2 * | 11/2010 | Williamson et al. | 124/20.1 |
| 2003/0094507 A1 | 5/2003 | Anzivino | |
| 2006/0118060 A1 * | 6/2006 | Ingraham et al. | 119/713 |
| 2006/0180092 A1 * | 8/2006 | Reiter | 119/712 |
| 2007/0277746 A1 * | 12/2007 | Piaget | 119/707 |
| 2011/0072709 A1 * | 3/2011 | Patterson et al. | 43/81 |
| 2011/0303208 A1 * | 12/2011 | Taylor | 124/54 |

* cited by examiner

*Primary Examiner* — Son T Nguyen
*Assistant Examiner* — Shadi Baniani
(74) *Attorney, Agent, or Firm* — Richard L. Mikesell

(57) ABSTRACT

A device for projecting ice cubes onto a roof to scare away birds, especially pigeons. The use of ice is environmentally friendly and will not jam gutters.

2 Claims, 1 Drawing Sheet

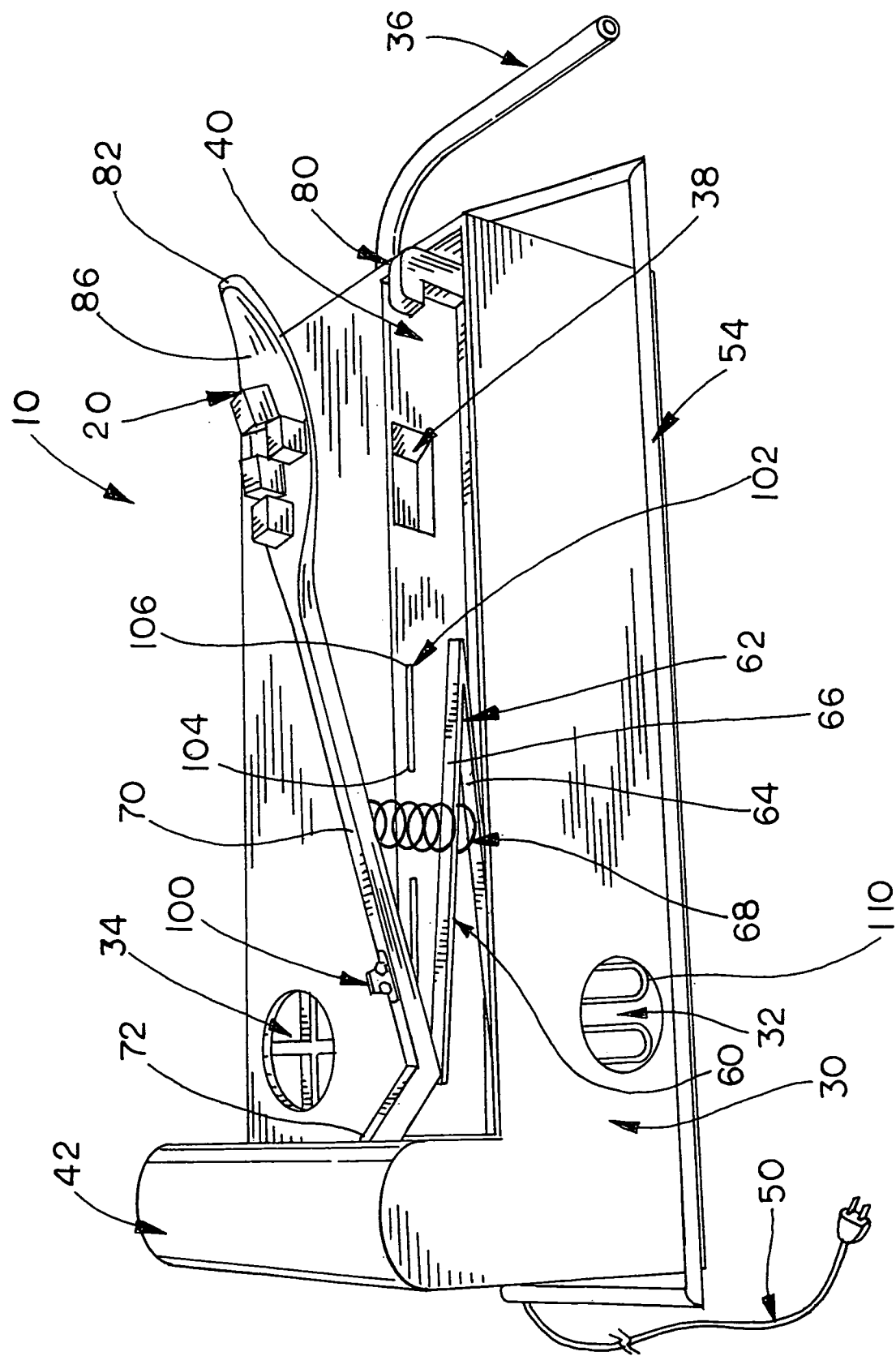

BIRD REPELLER

TECHNICAL FIELD OF THE INVENTION

The present invention relates to the general art of animal husbandry, and to the particular field of bird deterrents.

BACKGROUND OF THE INVENTION

Historically, birds have been a constant pest to all types of structures and activities of man. Particularly troublesome are areas with large populations of swallows, seagulls, and pigeons although other species such as starlings, sparrows, swallows and blackbirds create problems. Because of the noises they can make, and the mess they can leave behind, birds are not always welcomed. Private as well as public areas can be rendered unsightly and unusable because birds have chosen a nearby overhead position as a favorite perch. The nuisance created by the birds can also be unhealthy as diseases carried in fungi in bird droppings can be communicated to humans. These problems and others can affect the small private residence as well as the large corporate skyscrapers, and every type, size and shape structure inbetween.

In some areas, the pigeon is the primary offending bird. Along the coastlines, seagulls are most troublesome. In other areas, starlings, sparrows, swallows and blackbirds are most often the problem, although there are countless species that can be the culprit.

Numerous attempts have hitherto been made to propose means by which birds can be effectively and economically kept clear of a particular environment. There are many pieces of patent art that address the widespread problems related to intrusion by birds and pests into areas and locations where their presence is unwanted. This art has been particularly creative by involving a broad spectrum of approaches, ranging from simple "scarecrows" to airborne chemicals, magnetic devices and even lasers. Perhaps the most prevalent approaches include devices that produce high levels of sounds.

It is known for instance to cover the area with a net that thereby provides physical constraint but apart from the cost, enormous time and effort involved in using and locating nets makes these a very less preferred option.

Devices which are activated from an external power supply are known, but recalling that such devices must operate at the very least over many days or weeks and further that many might be required to effectively cover a vulnerable area means that firstly our supply and maintenance of power can be a significant difficulty especially if batteries are involved, and secondly with motor driven devices or other power operated devices, the cost becomes a very significant prohibiting item.

Devices which hang from the branches of trees and which are expected to move when there is wind, work either because there is often a rattling noise or they will cause some flashing effect.

Such devices as of this last type while relatively common because of their economy, have also not been found to be highly effective and it is in relation to these types of devices that this present invention relates.

Mock predators, such as owls, hawks or snakes have been erected. Some of these have been quite sophisticated, built to move periodically and to emit sound. But the birds usually quickly discover the ruse, and return, actually perching on their mortal enemy model.

Others have resorted to real-life predators, using peregrin falcons, for example, to disburse pigeons. These real predators, however, are expensive, indiscriminate, unreliable and largely ineffective.

Others have attempted to use a noise deterrence, omitting a reoccurring sharp report to scare the birds away. This, too, is only minimally effective, as the birds become quickly accustomed to the noise. Further, this method is not useful around humans, as the sound is as noisome to them as to the birds.

Other devices and methods which have been employed to combat the bird problem include a gel which is applied to the perch area, giving the bird a chemical hot-foot when it lands in the goo. Ultrasound emitters designed to irritate the birds are also available. These all have drawbacks. The chemical gel is sticky, and therefore dust, dirt and small objects adhere to it, making it unsightly. Also it loses its effectiveness over time. The ultrasound emitters are expensive, need a power source, and are of only limited effectiveness in open areas.

The most utilized prior art device comprises a continuous metal spine from which protrude a repetitive pattern of points prongs. This device is affixed by screws or nails to those areas where the birds would unwantedly perch. Any bird with the temerity to attempt to land on this device painfully realizes his folly.

While this device has proven effective, it is subject to several drawbacks. First, it can be injurious to the birds, as bloodied feet and impaled wings are not unusual. Second, it is potentially injurious to humans who unexpectedly come into contact with it. Third, it is relatively expensive. Fourth, it is somewhat unsightly and harsh in appearance. Fifth, papers and leaves can become impaled upon its tines, creating an eyesore.

Some people have even resulted to the ultimate sanction, actually killing large numbers of the offending birds in an attempt to frighten them off. This, of course, is highly disfavored as a deterrence means, but it is indicative of the levels of frustration experienced when an area goes literally "to the birds".

Pesticides in the form of spray poison and poisoned bird feed are known. These devices can harm or kill the birds, however, which is highly objectionable to many. Further, the distressed or dead birds often fall to the ground in the target area, creating another problem that may be worse than the original one.

One problem that has not been adequately addressed in the art is the problem associated with such birds roosting on the roof of a house. Homeowners often use many of the above-described devices to prevent such roosting. However, these devices are not usually suitable for homeowners due to cost, inconvenience, etc. Also, many of these devices are environmentally undesirable. Some homeowners resort to simply throwing rocks, twigs, or the like at the birds on the roof. This may scare the birds away, but may also jam the gutter system of the house, which is certainly undesirable.

Accordingly, there is a need for a means to scare birds away from the roof of a house in an efficient manner which is environmentally acceptable and which will not jam the gutter system of the house.

SUMMARY OF THE INVENTION

These, and other, objects are achieved by a device for projecting ice cubes onto a roof to scare away pigeons. The use of ice is environmentally friendly and will not jam gutters.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a perspective view of a bird deterrent embodying the present invention.

DETAILED DESCRIPTION OF THE INVENTION

Other objects, features and advantages of the invention will become apparent from a consideration of the following detailed description and the accompanying drawing.

Referring to the FIGURE, it can be understood that the present invention is embodied in a device 10 which catapults ice cubes 20 when activated. The device can be located and oriented to catapult ice cubes onto the roof of a house to scare away birds roosting on the roof. The ice cubes will eventually melt and the water will drain away in the gutter system harmlessly and in an environmentally friendly manner. The device can be activated by means of a timer, or a remote control or a simple on/off switch as is convenient. It is noted that the details of the motor along with the mechanical elements associated therewith are not important to the invention and those skilled in the art will understand the motor and its mechanical elements based on the teaching of this disclosure. As such, these details will not be provided or claimed.

Device 10 includes a housing 30 having a hollow interior 32 in which is located an ice cube making system which includes a mold 34 fluidically connected to a water intake 36 and to an ice cube dispensing system having an ice cube dispensing port 38 located in a channel 40. Ice cubes formed in the ice cube making system are dispensed from port 38 for a purpose which will be understood from the teaching of this disclosure. A motor (not seen in the FIGURE) is located in portion 42 of the housing and is powered from cord 50 and is controlled using arm 54 in the manner of an off/on switch.

A catapult assembly 60 is located in channel 40 and includes a spring system 62 having spring arms 64 and 66 mounted on the housing in channel 40 and having a coil spring 68 mounted on one arm 66 with a catapult arm 70 pivotally mounted at proximal end 72 thereof to the housing and connected to spring 68 to be strongly biased toward a catapulting position shown in FIG. 1 and adapted to be forced back into channel 40 and held therein by a lock element 80 releasably engaging distal end 82 of the catapult arm. Lock element 80 moves between a locking position in which the distal end of the catapult arm is engaged by the lock element to hold the arm against the bias of spring 68 and an unlocking position in which the lock element is moved away from engagement with the distal end of the catapult arm whereby the arm will be released to be moved by spring 68 toward the catapulting position of that arm. An ice cube holding portion 86 of the catapult arm is located adjacent to ice cube dispensing port 38 when the catapult arm is in a loaded orientation in the channel whereby ice cubes 20 will be catapulted when the lock element is moved by the motor to release the arm so the bias of the spring system will move it from a loaded orientation in the channel to the catapulting position. Spring 68 is selected to have a spring constant sufficient to force the catapult arm from its cocked position into the catapulting position with force sufficient to throw ice cubes located on the catapult arm off of that arm and at least one story (approximately ten feet) into the air above the device whereby such catapulted ice cubes will be thrown far and high enough to land on the roof of a building and frighten birds off of that roof. The spring can also be selected to catapult ice cubes higher than one story as well without departing from the scope of this disclosure.

Once the catapult arm is in the catapulting position, it is moved back into the loaded position by a system which includes a monorail element 100 that is slidably mounted on the housing via a track 102 and is operated by the motor. Movement of the monorail element from one end 104 of the track to the other end 106 of the track will force the catapult arm from the catapulting position shown in FIG. 1 back to the loaded position in the channel.

A heating coil 110 is included to ensure that water will flow through the appropriate conduits which may be located closely adjacent to a cooling unit associated with the ice cube making system.

Device 10 is located and oriented to catapult ice cubes onto a roof adjacent to birds on the roof so the landing ice cubes will scare the birds away and then move from the roof into the gutter system of the structure. The device can be manually operated using arm 54 or it can be connected to a timer system or to a remote control system as desired.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A unit for repelling birds away from a roof comprising:
   A) a housing having
      (1) a motor containing portion,
      (2) an ice forming portion,
      (3) a channel defined therein, and
      (4) an ice cube dispensing port fluidically connected to the channel;
   B) the ice forming portion including
      (1) an ice cube mold connected to the ice cube dispensing port so ice cubes are dispensed through the port into the channel, and
      (2) a heating coil;
   C) a water intake conduit fluidically connected to the ice forming portion;
   D) an ice cube catapult device located in the channel and including
      (1) spring system which has
         (a) first arm having one end thereof mounted on the housing and a second end thereof,
         (b) a catapult arm having one end thereof pivotally mounted on the housing and a second end, the catapult arm being located adjacent to the first arm,
         (c) a spring interposed between the first arm and the catapult arm and biasing the catapult arm outwardly of the channel,
         (d) an ice cube holding portion on the catapult arm, the ice cube holding portion being located on the catapult arm to be positioned adjacent to the ice cube dispensing port,
         (e) the catapult arm moving between a cocked orientation with the ice cube holding portion thereof located adjacent to the ice cube dispensing port to receive ice cubes dispensed through the port and a catapulting orientation with the holding portion located outside the channel and the catapult arm being oriented at an angle with respect to the channel, the catapult arm being moved from the cocked orientation to the catapulting orientation by bias of the spring whereby ice cubes located on the ice cube holding portion are catapulted off of the catapult arm, the spring having a spring constant which is selected to move the catapult arm with a force sufficient to catapult the ice cubes from the catapult arm at least one story into the air above the housing;

E) a catapult arm return unit which includes
  (1) a track defined in the housing adjacent to the channel and adjacent to the catapult arm when the catapult arm is in the cocked orientation in the channel, and
  (2) a monorail element movably mounted on the catapult arm and movably mounted in the track to move between a catapult arm releasing position and a catapult arm cocking position; and
F) a catapult arm lock located in the channel and movable between a catapult arm locking position which engages the catapult arm and holds the arm in the cocked orientation thereof and a catapult arm releasing position which releases the catapult arm to move under the bias of the spring.

2. The unit defined in claim 1 wherein the heating coil is located adjacent to the water intake conduit.

\* \* \* \* \*